United States Patent [19]
Chollet

[11] Patent Number: 4,592,491
[45] Date of Patent: Jun. 3, 1986

[54] DEVICE FOR EMPTYING RECIPIENTS CONTAINING PRODUCTS OF HIGH VISCOSITY

[75] Inventor: Gérard Chollet, Chelles-Les-Coudreaux, France

[73] Assignee: Fraco S.A., Seine-et-Marne, France

[21] Appl. No.: 640,699

[22] Filed: Aug. 14, 1984

[30] Foreign Application Priority Data

Aug. 17, 1983 [FR] France ................................ 83 13371

[51] Int. Cl.$^4$ .............................................. B67D 5/62
[52] U.S. Cl. ................................ 222/146.5; 222/258; 222/385; 417/313; 141/65; 241/101.2
[58] Field of Search ...................... 222/146.5, 258, 319, 222/385, 256, 260; 417/313, 900, 61; 210/242; 241/101.2; 141/65, 66, 7

[56] References Cited

U.S. PATENT DOCUMENTS

| | | | |
|---|---|---|---|
| 2,630,248 | 3/1953 | Hinz | 222/258 |
| 3,412,903 | 11/1968 | Van Riper et al. | 222/258 |
| 4,073,409 | 2/1978 | Gardner et al. | 222/146 HE |
| 4,355,734 | 10/1982 | Moore | 222/63 |

FOREIGN PATENT DOCUMENTS

2324904  4/1977  France .

Primary Examiner—Houston S. Bell, Jr.
Attorney, Agent, or Firm—Christel, Bean & Linihan

[57] ABSTRACT

A device for emptying a recipient containing a product of high viscosity, comprising an arrangement for introducing a plate, whose dimensions correspond substantially to those of the opening of the recipient, into the recipient, a pump for withdrawing this product, fast with the plate and having a withdrawal zone opening out on the frontal face of the plate in contact with the product, as well as an adjustable device for heating and cooling the plate. The said plate comprises a scraper system disposed in the vicinity of the frontal face, the scraper system being set in motion by a drive system so as to bring the product adjacent the frontal face towards the withdrawal zone of the pump.

9 Claims, 3 Drawing Figures

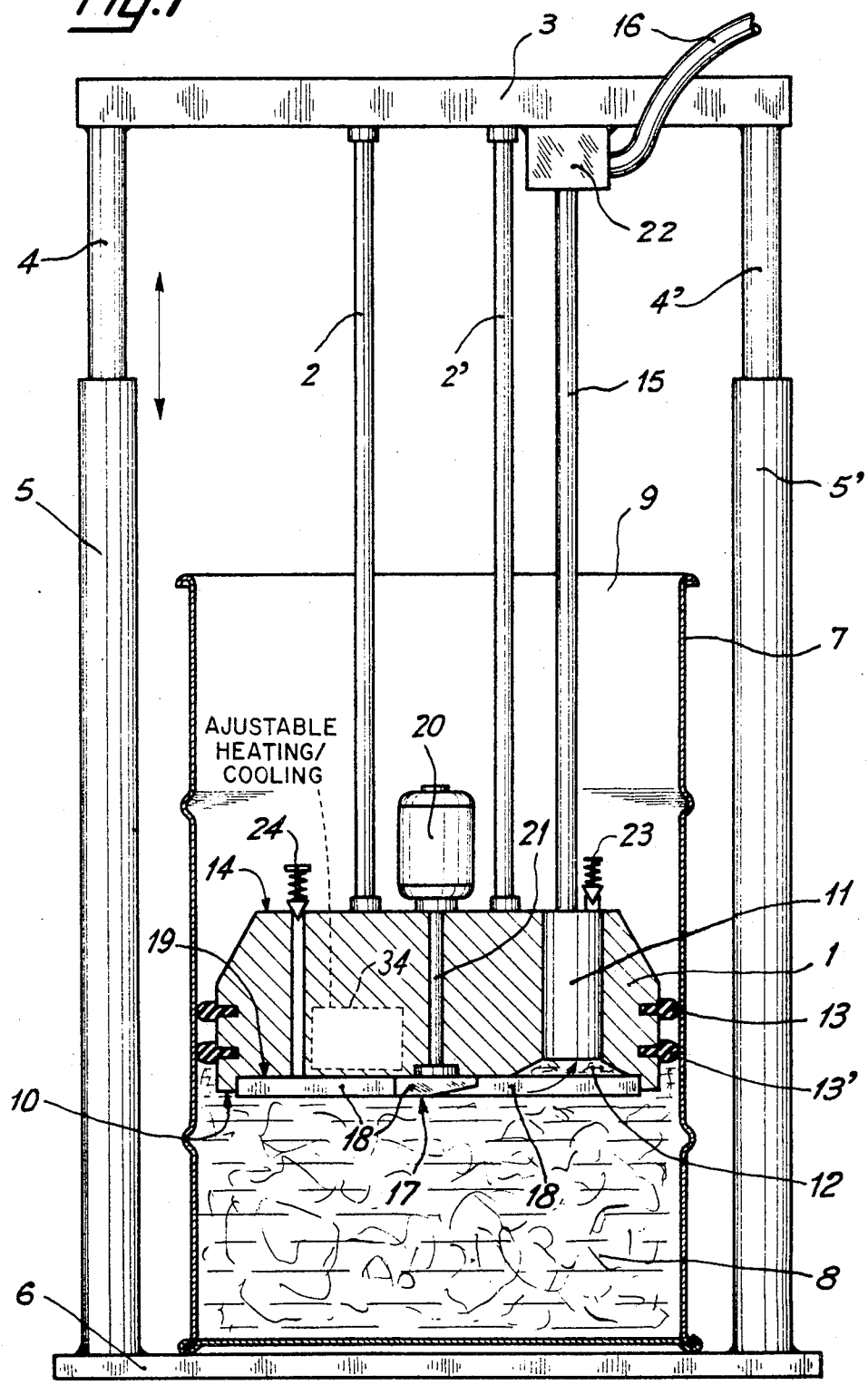

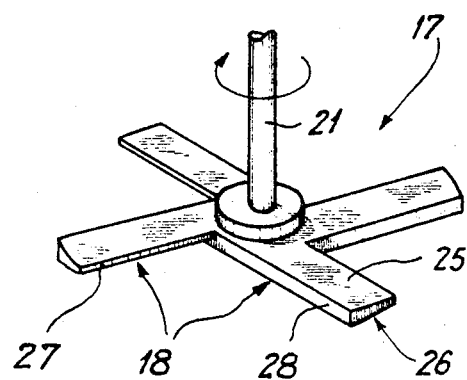
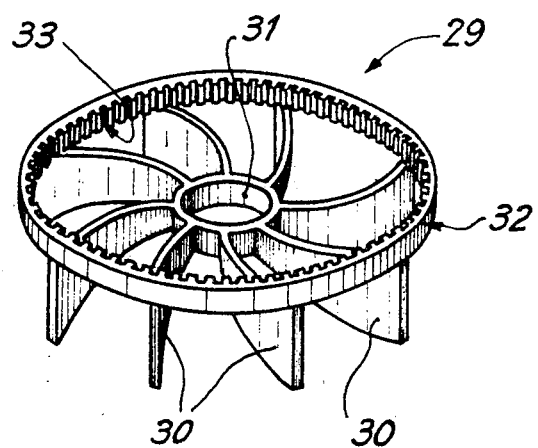

DEVICE FOR EMPTYING RECIPIENTS CONTAINING PRODUCTS OF HIGH VISCOSITY

The present invention relates to a device for emptying recipients containing products, thermofusible or not, whose viscosity is very high—of the order of 200,000 to several million centipoises—such as those used currently for gluing, sealing or for insulation, such as mastics, butyls, etc...

The device currently used for emptying such recipients is composed of a follower or pusher plate which is introduced into the recipients and which abuts on the product so as to compress it, and of a pneumatic pump incorporating blade or value, or of a gear pump, which enables the product to be withdrawn.

The drawbacks of such a device are very quickly observed if the rate of flow of product is to be high. In fact, the viscous products are not brought in a sufficient quantity to supply the pump: at the inlet thereof, a vacuum is formed within the product, which prevents the pump from being sufficiently supplied and it finishes by being drained. It then loses it efficiency and the product advances only under the effect of the follower-pusher plate.

It is an object of the present invention to provide a device whose pumping capacity is no longer limited to the supply flowrate procured by the action of the follower-pusher plate.

It is another object of the invention to enagle the product to be homogenized before pumping, both from the physical and thermal stand-point.

The object of the present invention is a device of this type which functions automatically.

These objects, as well as others which will appear hereinafter, are attained thanks to a device for emptying a recipient containing a product of high viscosity, comprising means for introducing a plate, whose dimensions correspond substantially to those of the opening of the recipient, into said recipient, means for pumping this product, fast with the plate having a withdrawal zone opening out on the frontal face of the plate in contact with the product, as well as adjustable means for heating and cooling the plate. According to the invention, the plate comprises a scraper system disposed in the vicinity of the frontal face, the scraper system being set in motion by means of a drive system so as to bring the product adjacent the frontal face towards the withdrawal zone.

In this way, the scraper system, associated with the pusher plate, ensures a constant supply of product at the withdrawal zone of the pump, at a rate of flow corresponding to the capacities of said pump. The movement of the scraper system homogenizes the product just before it is withdrawn.

The invention will be more readily understood on reading the following description with reference to the accompanying drawings, in which:

FIG. 1 is a view in elevation and partially in section of the device according to the invention.

FIG. 2 is a view in perspective of a first scraper system according to the invention.

FIG. 3 is a view in perspective of a second scraper system according to the invention.

Referring now to the drawings, the device of FIG. 1 essentially comprises a plate 1 suspended by two vertical tie-rods, 2, 2' fixed beneath a horizontal frame 3, itself fixed by its two ends to two mobile arms 4, 4' of two vertical jacks 5, 5' located beneath the frame 3. The bottoms of jacks 5, 5' are fixed on a base 6. Between the jacks 5, 5' and on the base 6, a cylindrical barrel 7, filled with a viscous product 8 which is to be extracted, is vertically disposed.

The top face 9 of the barrel 7 is open so that the plate 1, which is circular and of diameter slightly less than the inner diameter of the barrel 7, can penetrate into said barrel and exert a pressure on the product 8 by its frontal face 10 which is generally flat. One or more supple wads 13, 13' fixed on the periphery of the plate 1, one above the other, abut on the inner wall of the barrel 7 so as to prevent the product from rising along this wall.

Means 11 for pumping the product (not shown in detail) are disposed in the thickness of the plate 1, at a certain radial distance from the vertical axis of the plate 1. They open out on the frontal face 10 of the plate 1 in a withdrawal zone 12, and are connected on the free face 14 of the plate 1 to one of the ends of a vertical delivery conduit 15 which is fixed by its other end to the frame 3, and ensures transfer of the product towards a supple hose 16. Furthermore, adjustable means 34 (not shown in detail) for heating and/or cooling the plate 1 are provided to promote extraction of the product, depending on the nature thereof.

According to the invention, the plate 1 comprises a generally flat scraper system 17 disposed in the vicinity of its frontal face 10 and parallel thereto. This scraper system 17 is shown in greater detail in FIG. 2. It is constituted by four arms 18 or more, disposed as a cross along radii of the cylindrical barrel 7, each being connected by one of its ends to a common central zone. The span of this scraper system 17 is such that it is inscribed in a circle of diameter slightly less than that of the plate 1. Each arm 18 presents an upper main face 25 parallel to the plane of the scraper system 1 and a lower main face 26 disposed obliquely with respect to this plane so as to present a front longitudinal edge 28, or leading edge attacking the product, which is thicker than its rear edge 27, each arm 18 then behaving as a sort of knife which cuts into the product.

The scraper system 17 is partially housed in a circular recess 19 made in the frontal face 10, and projects with respect to said frontal face 10.

The scraper system 17 is connected at its centre to an electric or pneumatic motor 20 fixed vertically to the centre of the free face 14 of the plate 1, via a vertical transmission shaft 21 which passes through the plate 1 in its thickness. In this way, the scraper system 17 may rotate in its plane about the axis of the transmission shaft 21.

The pumping means 11 are offset radially with respect to the axis of the plate 1 so that the scraper arms 18 come level, in turn, with the withdrawal zone 12, when the motor 20 is set in motion.

The profile given to the arms 18 promotes scraping of the product near the plate 1, and ensures a constant supply of product to the withdrawal zone 12. Moreover, the scraper system 17 enables the barrel to be emptied uniformly over the whole of its section.

The scraper system 17 conducts towards the withdrawal zone 12 the product effectively in contact with the plate 1 and therefore avoids pumping a product whose temperature is not regulated.

For certain types of products, it will be advantageous to dispose the withdrawal zone 12 at the centre of the plate 1, the scraper system 17 then being driven in rotation in the vicinity of the walls of the barrel 7, as illustrated hereinafter.

By progressively lowering the frame 3, with the aid of jacks 5, 5', the plate 1 maintains the product constantly compressed, the level of said product lowering during extraction thereof.

Homogenizing the product and conduction thereof towards the withdrawal zone 12 may be regulated as a function of the pressure exerted by the jacks 5, 5' and of the speed of rotation of the scraper system 17. As a function of the requirements of the product, it is possible to regulate its flowrate by adjusting the pressure of the pneumatic pump, or in the case of a gear pump, thanks to a control and regulating means advantageously in accordance with those described in French Pat. No. 75 28565.

A filtration unit 22, fixed on the frame 3, may be interposed between the delivery conduit 15 and the supple hose 16.

A bleed 23 disposed on the pumping means 11 makes it possible to evacuate the air at the beginning of the pumping operation, in manner known per se. Similarly, a system 24 for communication with the free air enables the plate 1 to be detached from the barrel 7 when the latter is empty.

FIG. 3 shows another scraper system 29, which may be used when the withdrawal zone lies at the centre of the plate 1. It comprises a plurality of arms provided in the form of fins 30 extending, in length, radially outwardly from a central ring 31, in the plane thereof. The fins 30 are fixed to the periphery of the ring 31 by their first end, and they extend, in width, vertically with respect to the plane of the ring 31.

The other end of each of the fins 30 is fixed by its upper angle to an outer ring 32 concentric to ring 31. Each fin 30 has, vertically, a width which increases from the ring 31 towards the ring 32. It presents an incurved form, seen in plan view of the scraper system, the leading edge of each fin being its concave face. In this way, during rotation of the scraper system 29, each fin scrapes the product and tends, by its shape, to conduct it inwardly of the central ring 31, therefore in the vicinity of the withdrawal zone of the pump. The ring 32 is provided with a toothing 33 on its inwardly turned face so as to be able to cooperate with a pinion fast with the drive shaft of the motor, which is radially offset with respect to the axis of the plate.

The invention is, of course, not limited to the embodiments described hereinabove. For example, particularly in the case of rectangular recipients, a scraper system may be provided which moves linearly parallel to two sides of the recipient.

The invention is particularly applicable to the distribution of products of very high viscosity.

What is claimed is:

1. In a device for emptying a recipient containing a product of high viscosity, comprising means for introducing a plate, whose dimensions correspond substantially to those of the opening of the recipient, into said recipient, means for pumping this product, fast with the plate and having a withdrawal zone opening out on the frontal face of the plate in contact with the product, as well as adjustable means for heating and cooling the plate, said plate comprises a scraper system disposed in the vicinity of the frontal face, the scraper system being set in motion by means of a drive system so as to bring the product adjacent the frontal face towards the withdrawal zone.

2. The device of claim 1, wherein, the recipient being cylindrical, said scraper system comprises a plurality of scraper arms disposed substantially along radii of said recipient, and it is animated by a movement of rotation about the axis of said recipient.

3. The device of claim 2, wherein said scraper system is connected to said drive system by its central region, said withdrawal zone being offset radially with respect to the axis of said recipient.

4. The device of claim 2, wherein said scraper system comprises a circular peripheral ring which cooperates with said drive system, said withdrawal zone being located in the vicinity of the axis of said recipient.

5. The device of claim 1, wherein, the recipient resting on a base, said means for introducing the plate comprise two vertical tie-rods by which said plate is suspended from a frame resting on two vertical jacks, which abut on said base.

6. The device of claim 2, wherein, the recipient resting on a base, said means for introducing the plate comprise two vertical tie-rods by which said plate is suspended from a frame resting on two vertical jacks, which abut on said base.

7. The device of claim 3, wherein, the recipient resting on a base, said means for introducing the plate comprise two vertical tie-rods by which said plate is suspended from a frame resting on two vertical jacks, which abut on said base.

8. The device of claim 4, wherein the recipient resting on a base, said means for introducing the plate comprise two vertical tie-rods by which said plate is suspended from a frame resting on two vertical jacks, which abut on said base.

9. In a device for emptying a recipient containing a product of high viscosity on the order of from about 200,000 to about several million centipoises, comprising means for introducing a plate, whose dimensions correspond substantially to those of the opening of the recipient, into said recipient, means for pumping this product, fast with the plate and having a withdrawal zone opening out on the frontal face of the plate in contact with the product, and said plate comprising a scraper system disposed in the vicinity of the frontal face, the scraper system being set in motion by means of a drive system so as to bring the product adjacent the frontal face towards the withdrawal zone.

* * * * *